United States Patent
Hochschild et al.

(10) Patent No.: US 12,386,384 B1
(45) Date of Patent: Aug. 12, 2025

(54) GENERATING GLOBALLY COHERENT TIMESTAMPS

(71) Applicant: Google LLC, Mountain View, CA (US)

(72) Inventors: Peter Hochschild, New York, NY (US); Alexander Lloyd, New York, NY (US); Wilson Cheng-Yi Hsieh, Syosset, NY (US); Robert Edman Felderman, Portola Valley, CA (US); Michael James Boyer Epstein, Brooklyn, NY (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/596,819

(22) Filed: Mar. 6, 2024

Related U.S. Application Data

(60) Continuation of application No. 17/740,688, filed on May 10, 2022, now Pat. No. 11,953,938, which is a continuation of application No. 16/992,673, filed on Aug. 13, 2020, now Pat. No. 11,353,917, which is a continuation of application No. 15/877,845, filed on Jan. 23, 2018, now Pat. No. 10,775,837, which is a division of application No. 14/925,278, filed on Oct.

(Continued)

(51) Int. Cl.
| | | |
|---|---|---|
| G06F 1/12 | (2006.01) | |
| G01S 19/01 | (2010.01) | |
| G06F 11/16 | (2006.01) | |
| H04J 3/06 | (2006.01) | |
| H04L 7/00 | (2006.01) | |
| H04L 43/106 | (2022.01) | |
| H04L 67/10 | (2022.01) | |

(52) U.S. Cl.
CPC ............ *G06F 1/12* (2013.01); *G01S 19/01* (2013.01); *H04J 3/0661* (2013.01); *H04J 3/0667* (2013.01); *H04L 7/0008* (2013.01); *H04L 7/0012* (2013.01); *H04L 7/0016* (2013.01); *H04L 43/106* (2013.01); *H04L 67/10* (2013.01); *G06F 11/1675* (2013.01)

(58) Field of Classification Search
CPC ...... G06F 1/12; G06F 11/1675; H04L 43/106; H04L 67/10; H04L 7/0008; H04L 7/0012; H04L 7/0016; H04J 3/0661; H04J 3/0667; G01S 19/01
USPC ......................................... 713/375, 401, 503
See application file for complete search history.

(56) References Cited

U.S. PATENT DOCUMENTS

| | | | | |
|---|---|---|---|---|
| 5,504,899 | A | 4/1996 | Raz | |
| 5,640,388 | A * | 6/1997 | Woodhead | ....... H04N 21/23608 375/E7.269 |

(Continued)

OTHER PUBLICATIONS

Alexander Thomson and Daniel J. Abadi, The Case for Determinism in Database Systems, 2010, 11 pages.

*Primary Examiner* — Ji H Bae
(74) *Attorney, Agent, or Firm* — Lerner David LLP

(57) ABSTRACT

The present technology proposes techniques for generating globally coherent timestamps. This technology may allow distributed systems to causally order transactions without incurring various types of communication delays inherent in explicit synchronization. By globally deploying a number of time masters that are based on various types of time references, the time masters may serve as primary time references. Through an interactive interface, the techniques may track, calculate and record data relative to each time master thus providing the distributed systems with causal timestamps.

20 Claims, 8 Drawing Sheets

Related U.S. Application Data 28, 2015, now Pat. No. 9,915,970, which is a continuation of application No. 14/567,294, filed on Dec. 11, 2014, now Pat. No. 9,203,600, which is a continuation of application No. 13/475,143, filed on May 18, 2012, now Pat. No. 8,938,636.

(56) References Cited

U.S. PATENT DOCUMENTS

| | | | |
|---|---|---|---|
| 6,052,363 | A | 4/2000 | Koch |
| 6,581,110 | B1 | 6/2003 | Harif et al. |
| 7,362,767 | B2 | 4/2008 | Orberk et al. |
| 8,938,636 | B1 | 1/2015 | Hochschild et al. |
| 9,203,600 | B1 | 12/2015 | Hochschild et al. |
| 9,674,562 | B1* | 6/2017 | Spracklen ............ H04N 21/233 |
| 9,915,970 | B1 | 3/2018 | Hochschild et al. |
| 10,775,837 | B1 | 9/2020 | Hochschild et al. |
| 11,353,917 | B1 | 6/2022 | Hochschild et al. |
| 11,442,925 | B1 | 9/2022 | Hsieh |
| 11,953,938 | B1* | 4/2024 | Hochschild ............... G06F 1/12 |
| 2002/0036984 | A1 | 3/2002 | Chiussi et al. |
| 2004/0218633 | A1* | 11/2004 | Burzynski ........ H04N 21/23608 375/E7.022 |
| 2005/0058159 | A1* | 3/2005 | Chapman ............. H04J 3/0694 370/510 |
| 2005/0193095 | A1* | 9/2005 | Driediger ................. G06F 1/14 709/248 |
| 2005/0210153 | A1 | 9/2005 | Rich et al. |
| 2005/0210306 | A1 | 9/2005 | Rich et al. |
| 2007/0047591 | A1 | 3/2007 | Senthilnathan et al. |
| 2007/0239356 | A1 | 10/2007 | Woz |
| 2008/0159240 | A1* | 7/2008 | Hamilton ................ H04L 65/00 370/338 |
| 2008/0175275 | A1 | 7/2008 | Garner |
| 2008/0244094 | A1 | 10/2008 | Rich et al. |
| 2008/0313496 | A1 | 12/2008 | Prabhakaran et al. |
| 2009/0012932 | A1 | 1/2009 | Romem et al. |
| 2009/0022089 | A1 | 1/2009 | Rudrapatna |
| 2009/0089078 | A1 | 4/2009 | Bursey |
| 2009/0310593 | A1 | 12/2009 | Sheynblat et al. |
| 2010/0082772 | A1 | 4/2010 | Suzuki |
| 2010/0185781 | A1 | 7/2010 | Anderson |
| 2011/0023044 | A1 | 1/2011 | Krutyolkin et al. |
| 2012/0102006 | A1 | 4/2012 | Larson et al. |
| 2012/0275333 | A1 | 11/2012 | Cociglio |
| 2013/0034197 | A1 | 2/2013 | Aweya et al. |
| 2013/0266306 | A1* | 10/2013 | Kozaki ............. H04Q 11/0067 398/5 |
| 2014/0006458 | A1 | 1/2014 | Hsieh et al. |
| 2015/0127978 | A1 | 5/2015 | Cui et al. |

\* cited by examiner

GENERATING GLOBALLY COHERENT TIMESTAMPS

CROSS-REFERENCE TO RELATED APPLICATIONS

The present application is a continuation of U.S. patent application Ser. No. 17/740,688, filed May 10, 2022, which is a continuation of U.S. patent application Ser. No. 16/992,673, filed on Aug. 13, 2020, which is a continuation of U.S. patent application Ser. No. 15/877,845, filed on Jan. 23, 2018, now U.S. Pat. No. 10,775,837, which is a divisional of U.S. patent application Ser. No. 14/925,278, filed on Oct. 28, 2015, now U.S. Pat. No. 9,915,970, which is a continuation of U.S. patent application Ser. No. 14/567,294, filed on Dec. 11, 2014, now U.S. Pat. No. 9,203,600, which is a continuation of U.S. patent application Ser. No. 13/475,143, filed May 18, 2012, now U.S. Pat. No. 8,938,636, the disclosures of which are incorporated herein by reference.

BACKGROUND

In a distributed system, many applications rely on event ordering to be successful. Event ordering can be made easier if systems can accurately timestamp events, but clocks in a distributed system are not always synchronized. One way of obtaining synchronized timestamps is with a network time protocol (NTP) service. By using a NTP service, clients may attempt to synchronize themselves by periodically querying a time master that may respond with a timestamp packet. The time queries and responses from the time master may allow a client to estimate its clock phase and frequency error, and adjust clock rates accordingly.

Several forms of uncertainty may afflict such query-based measurements. For example, delays induced by scheduling, network congestion, interrupt coalescing, routing asymmetry, system overloads, and other causes can prove to be as unpredictable as they are asymmetric. Moreover, a typical NTP's notion of time synchronization may be fundamentally flawed because no master can be entirely trustworthy. Thus, it may be prudent for clients not to make time adjustments based solely on a single master's response.

SUMMARY

Aspects of this disclosure may be advantageous for generating globally synchronized timestamps without incurring various types of network delay inherent in explicit synchronization. The globally synchronized timestamps can be used by various services, e.g., to validate local timestamps and clocks, or to provide causality-respecting timestamps for database updates. By introducing techniques to track, calculate and record time data relative to a number of reliable time references, an easy-to-manage and low-cost time base may be provided for host machines in a distributed system.

One aspect of the disclosure provides a method that includes receiving an initial local timestamp, receiving reference timestamps transmitted from a plurality of time references, receiving a time-of-arrival local timestamp, determining transmission delays associated with the time references, and calculating, using a processor, time offset intervals corresponding to the time references. Each time offset interval includes a set of time offsets that represent differences between a given reference timestamp and the initial and time-of-arrival local timestamps. In this regard, the set of time offsets compensate for the transmission delay associated with the corresponding time reference. The method also includes selecting at least one of the time offset intervals based on an occurrence of that time offset interval among the calculated time offset intervals. In one example, the selected time offset interval has a highest occurrence among the calculated time offset intervals. In another example, determining transmission delays includes estimating an amount of time associated with receiving reference timestamps from a given time reference. The method may also include determining a timing error in local timestamps generated based on a local clock by comparing the local timestamps to the reference timestamps, and adjusting the local timestamps with the time offsets from the selected time offset interval. In one example, adjusting the local timestamps includes waiting for a period of time to pass.

Another aspect of the disclosure provides a system that includes a memory, a local clock, a receiver module adapted to receive reference and time-of-arrival local timestamps from a plurality of time references, and a processor coupled to the memory. The processor may be configured to receive an initial local timestamp based on the local clock, register in memory reference timestamps received by the receiver module, determine transmission delays associated with the time references, and calculate time offset intervals corresponding to the time references. Each time offset interval includes a set of time offsets that represent differences between a given reference timestamp and the initial and time-of-arrival local timestamps. In this regard, the set of time offsets compensates for the transmission delay associated with the corresponding time reference. The processor is also configured to select at least one of the time offset intervals based on an occurrence of that time offset interval among the calculated time offset intervals.

Yet another aspect of the disclosure provides a tangible, computer-readable storage medium that includes instructions that, when executed by a processor, cause the processor to perform a method. The method includes receiving an initial local timestamp, receiving reference timestamps transmitted from a plurality of time references, receiving a time-of-arrival local timestamp, determining transmission delays associated with the time references, and calculating, using a processor, time offset intervals corresponding to the time references. Each time offset interval includes a set of time offsets that represent differences between a given reference timestamp and the initial and time-of-arrival local timestamps. In this regard, the set of time offsets compensates for the transmission delay associated with the corresponding time reference. The method also includes selecting at least one of the time offset intervals based on an occurrence of that time offset interval among the calculated time offset intervals.

DETAILED DESCRIPTION

Aspects, features and advantages of this disclosure will be appreciated when considered with reference to the following description of embodiments and accompanying figures. It should be noted that the same reference numbers in different drawings may identify the same or similar elements. Furthermore, the following description is not limiting; the scope of the present technology is defined by the appended claims and equivalents.

In this disclosure, systems and methods are provided for generating globally coherent timestamps. This technology may allow distributed systems to causally order transactions without incurring various types of communication delays inherent in explicit synchronization. By globally deploying a number of time masters that are based on various types of time references (e.g., Global Positioning Systems (GPS) and atomic clocks), the masters may serve as primary time references for the distributed systems. Techniques described herein may be used to request, track, calculate and record data relative to each time master. This data can be cross checked against a number of time masters in order to assess which time masters may be malfunctioning and which time masters may provide validated causal timestamps to clients.

Figure 1:
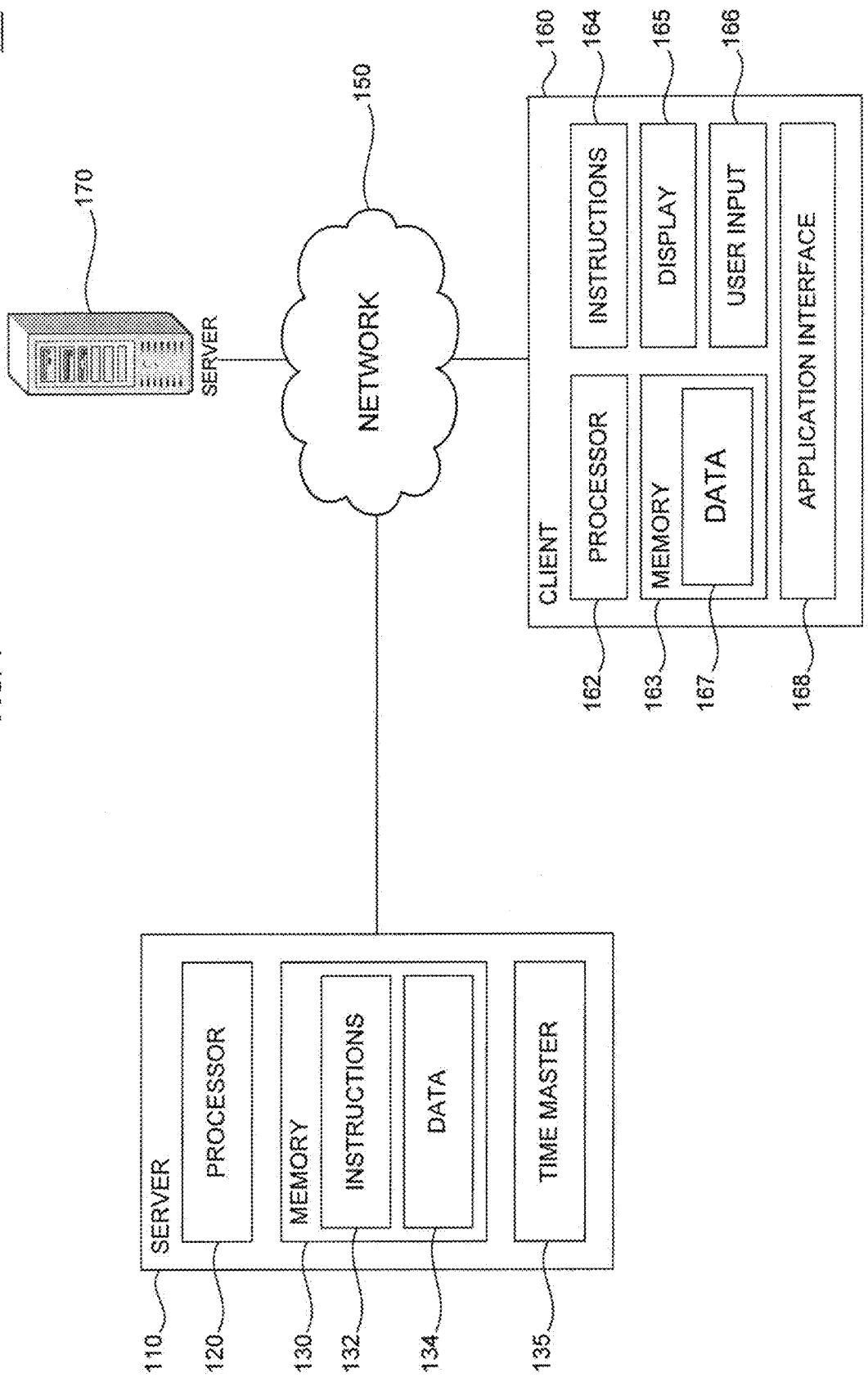
FIG. 1 is a diagram of a system according to aspects of the present technology.

FIG. 1 is a diagram of a system 100 in accordance with an aspect of the present technology. As shown, an exemplary embodiment of system 100 may include a number of servers 110 and 170 coupled to a network 150. The system may also include a client 160 capable of wireless communication with the servers 110 and 170 over the network 150.

A server 110 may contain a processor 120, memory 130, and other components typically present in general purpose computers. The memory 130 may store information accessible by the processor 120, including instructions 132 that may be executed by the processor 120. Memory may also include data 134 that can be retrieved, manipulated or stored by the processor 120. The memory 130 may be a type of non-transitory computer readable medium capable of storing information accessible by the processor 120, such as a hard-drive, memory card, ROM, RAM, DVD, CD-ROM, write-capable, and read-only memories. The processor 120 may be a well-known processor, such as processors from Intel Corporation or Advanced Micro Devices. Alternatively, the processor 120 may be a dedicated controller such as an ASIC.

The instructions 132 may be a set of instructions executed directly (such as machine code) or indirectly (such as scripts) by the processor 120. In this regard, the terms "instructions," "steps" and "programs" may be used interchangeably herein. The instructions 132 may be stored in object code format for direct processing by the processor 120, or other types of computer language including scripts or collections of independent source code modules that are interpreted on demand or compiled in advance. Functions, methods and routines of the instructions are explained in more detail below.

The data 134 may be retrieved, stored or modified by the processor 120 in accordance with the instructions 132. For instance, although the system and method is not limited by a particular data structure, the data 134 may be stored in computer registers, in a relational database as a table having a plurality of different fields and records, or XML documents. The data 134 may also be formatted in a computer-readable format such as, but not limited to, binary values, ASCII or Unicode. Moreover, the data 134 may comprise information sufficient to identify relevant information, such as numbers, descriptive text, proprietary codes, pointers, references to data stored in other memories (including other network locations) or information that is used by a function to calculate relevant data.

Although FIG. 1 functionally illustrates the processor 120 and memory 130 as being within the same block, it will be understood by those of ordinary skill in the art that the processor 120 and memory 130 may actually comprise multiple processors and memories that may or may not be stored within the same physical housing. For example, some of the instructions and data may be stored on a removable CD-ROM and others within a read-only computer chip. Some or all of the instructions and data may be stored in a location physically remote from, yet still accessible by, the processor 120. Similarly, the processor 120 may actually comprise a collection of processors, which may or may not operate in parallel.

As shown in FIG. 1, servers 110 and 170 may also include a time master module 135. The time master module 135 may be operable in conjunction with a receiver for receiving time signals. Time masters 135 may serve as accurate time references in a distributed system for (1) synchronizing machines and devices and (2) validating and monitoring that synchronization. This may include serving a reference time to a core network of machines and their supporting infrastructure. For example, an incoming time query from a client 160 may receive a timestamp determined by the time master 135. The timestamps may be based on various types of systems known in the arts for providing an accurate and reliable time reference (e.g., a GPS system).

According to aspects, servers 110 and 170 may consist of middleware software that may manage and integrate the time master module 135 with internal components of the servers 110 and 170. In one aspect, the middleware may consist of a set of services that allow multiple processes running from the time master module 135 to interact with the processor 120, memory 130, instructions 132 and data 134. In some aspects, it may be neither desirable nor possible to run other types of NTP services on a host server 110 in conjunction with a time master module 135. For example, system conflicts can occur over ports assigned to the NTP service severely impacting a time master's reliability.

Servers 110 and 170 may be at a node of network 150 and capable of directly and indirectly communicating with other nodes of the network 150. For example, the servers 110 and 170 may comprise a web server that may be capable of communicating with client device 160 via network 150 such that it uses the network 150 to transmit information to a client application. Servers 110 and 170 may also comprise a plurality of computers, e.g., a load balanced server farm, that exchange information with different nodes of a network for the purpose of receiving, processing and transmitting data to client devices. In this instance, the client computer will typically still be at different nodes of the network 150 than the computers comprising servers 110 and 170. Although only a few servers 110, 170 are depicted in FIG. 1, it should be appreciated that a typical system can include a large number of connected servers with each being at a different node of the network 150.

Each client 160 may be configured, similarly to servers 110 and 170, with a processor 162, memory 163, instructions 164, and data 167. Each client 160 may be a personal computer, intended for use by a person having all the internal components normally found in a personal computer such as a central processing unit (CPU), an optional display device 165 (for example, a monitor having a screen, a projector, a touch-screen, a small LCD screen, a television, or another device such as an electrical device that can be operable to display information processed by the processor), CD-ROM, hard drive, user input 166 (for example, a mouse, keyboard, touch screen or microphone), speakers, modem and/or network interface device (telephone, cable or otherwise) and all of the components used for connecting these elements to one another. Moreover, computers in accordance with the systems and methods described herein may comprise devices capable of processing instructions and transmitting data to and from humans and other computers including general purpose computers, PDAs, network computers lacking local storage capability, set top boxes for televisions, and other networked devices.

Although the client 160 may comprise a full-sized personal computer, the systems and methods of this disclosure may also be used in connection with mobile devices capable of wirelessly exchanging data over a network such as the Internet. By way of example only, a client 160 may be a wireless-enabled PDA, tablet PC, or a cellular phone capable of sending information via the Internet. The user may input information, for example, using a small keyboard, a keypad, or a touch screen.

As shown in FIG. 1, the client 160 may include an application interface module 168. The application interface module may be used to access a service made available by a server such as servers 110 and 170. The application interface module 168 may be a software module operable in conjunction with several types of operating systems known in the arts. For example, the client 130 may be connected to a SQL (Structured Query Language) database server that may operate in conjunction with the application interface module 168 for saving and retrieving information data. Memory 163 coupled to a client 160 may store data 167 accessed by the application module 168. The data 167 can also be stored on a removable medium such as a disk, tape, SD Card or CD-ROM, which can be connected to client 160.

Servers 110 and 170 and client 160 may be capable of direct and indirect communication such as over network 150. For example, using an Internet socket, a client 160 may connect to a service operating on remote servers 110 and 170 through an Internet protocol suite. Servers 110 and 170 may set up listening sockets that may accept an initiating connection for sending and receiving information.

The network 150, and intervening nodes, may comprise various configurations and protocols including the Internet, World Wide Web, intranets, virtual private networks, wide area networks, local networks, private networks using communication protocols proprietary to one or more companies, Ethernet, WiFi (such as 802.11, 802.11b, g, n, or other such standards), and HTTP, and various combinations of the foregoing. Such communication may be facilitated by a device capable of transmitting data to and from other computers, such as modems (e.g., dial-up, cable or fiber optic) and wireless interfaces.

Although certain advantages are obtained when information is transmitted or received as noted above, other aspects of the system and method are not limited to a particular manner of transmission of information. Yet further, although some functions may be indicated as taking place on a single server having a single processor, various aspects of the system and method may be implemented by a plurality of servers, for example, communicating information over network 150.

Figure 2:
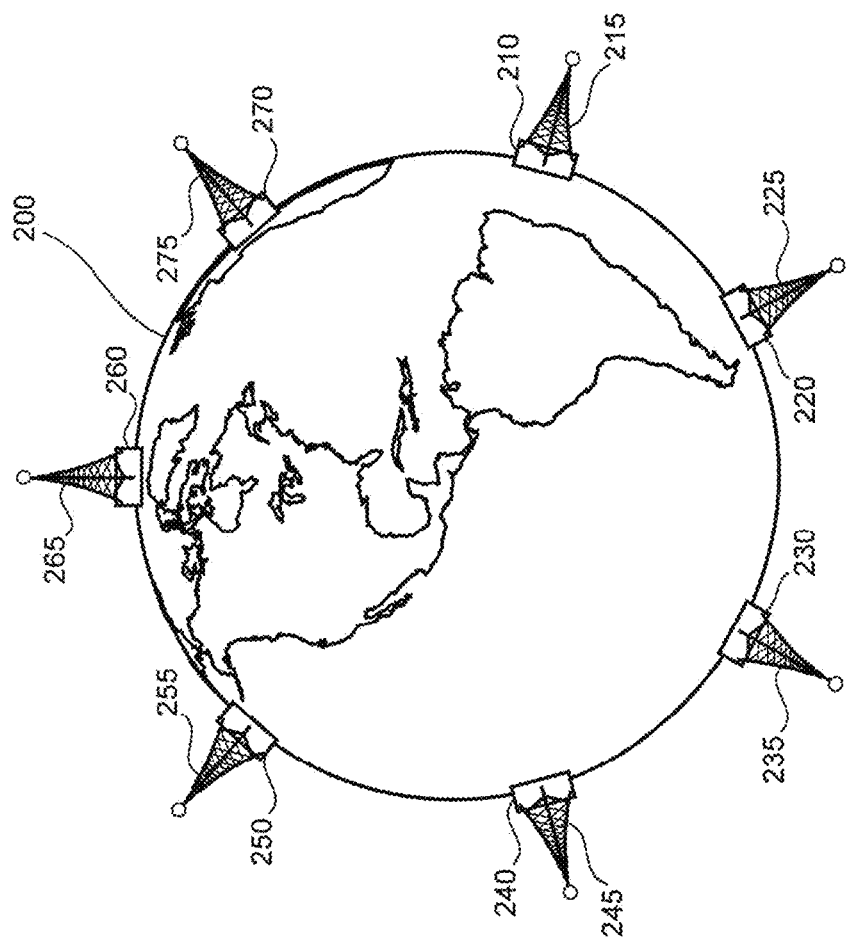
FIG. 2 is a geographical illustration of data centers positioned at various locations on earth according to aspects of the present technology.

FIG. 2 is a geographical illustration of data centers 210, 220, 230, 240, 250, 260 and 270 positioned at various locations on earth. In this example, because of the world wide coverage of a robust global navigation satellite system (GNSS), it may be possible to deploy time masters in data centers 210, 220, 230, 240, 250, 260 and 270 around the world 200. Other existing time distribution systems may not come close to a GNSS system when measured based on reliability, accuracy, coverage and cost. In one aspect, all major data centers in a distributed system may be equipped with redundant time masters, which may provide a stable low-latency time reference to the data center. Redundant time masters may also provide fail-over capability, fault detection, localization and a means for cross checking time masters.

As previously discussed, each host server may be connected to a receiver such as a GPS receiver for receiving time signals. For resilience, it may be preferable to employ several varieties of GPS receivers, e.g., SPECTRACOM Model TSync-PCIe, SYMMETRICOM Model bc637PCI-V2 and MEINBERG. The GPS receivers may require roof-mounted antennas 215, 225, 235, 245, 255, 265 and 275, which may be located on the roof above data centers 210, 220, 230, 240, 250, 260 and 270. Host servers may be housed in server racks located in the data centers 210, 220, 230, 240, 250, 260 and 270. As such, conduits may be installed to route antenna cables from a host server to the roof top antennas. It may be possible to share one antenna across several receivers. This can be achieved, for example, with an antenna splitter. However, antenna sharing may be undesirable because of the low possibility of an antenna failure.

It is conceivable that a GPS receiver may fail. For example, possible scenarios may include latent bugs in GPS receivers, software and satellite software upgrades, and a global catastrophe. In the case of a GPS failure, the ability of a time master to freewheel (e.g., run without a GPS time reference) for several months may allow for enough time to make alternate arrangements. This type of specially configured time master implemented for emergency situations is described in greater detail with respects to FIG. 3.

Figure 3:
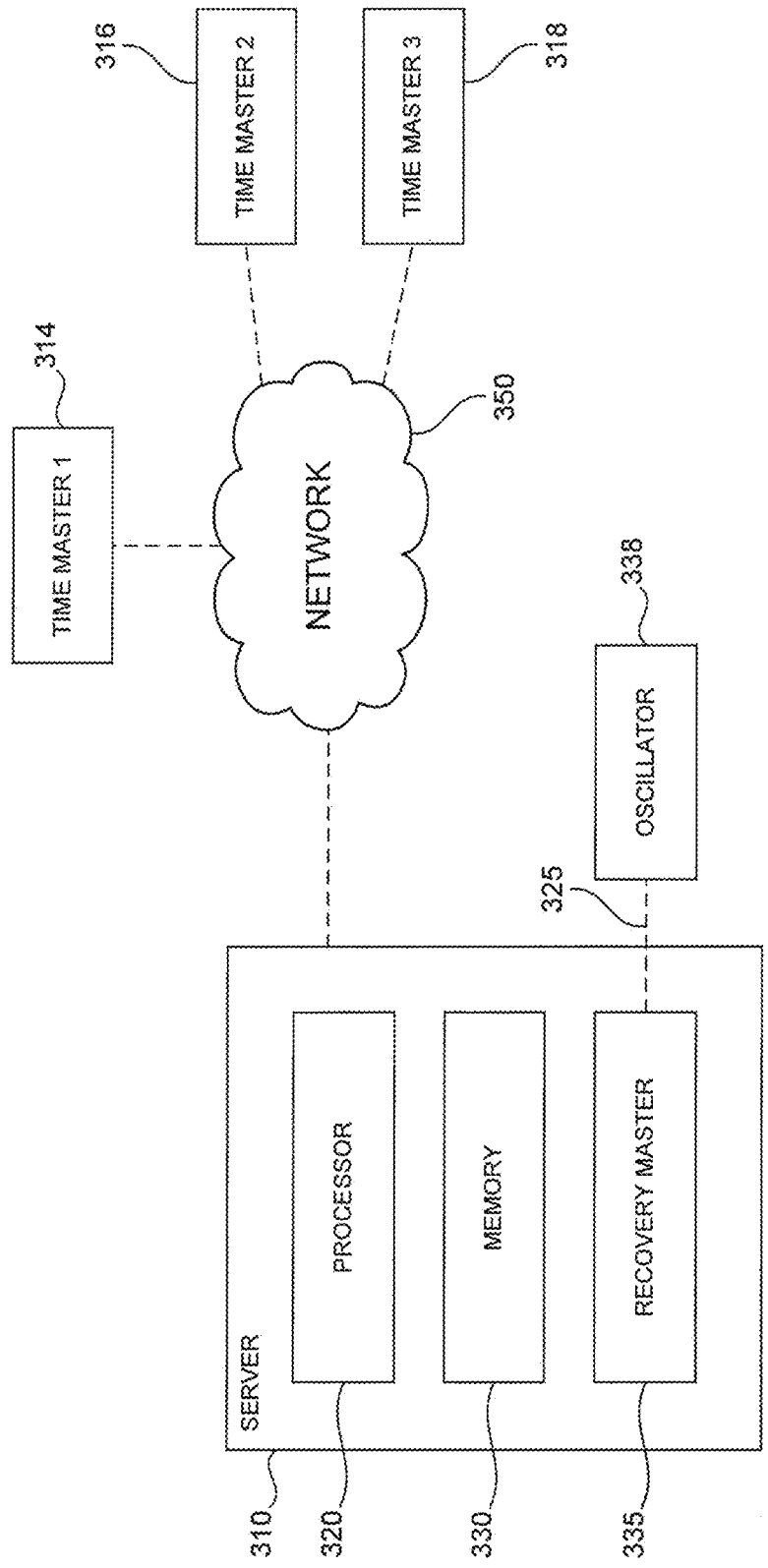
FIG. 3 is another diagram of a system according to aspects of the present technology.

FIG. 3 is another diagram of a system 300 in accordance with some aspects of the present technology. In FIG. 3, a specially configured server 310 may be employed during emergencies to support "Recovery" services. The server 310 may contain a processor 320, memory 330, and other components typically present in general purpose computers. Its components may interact in a similar manner as the components of the servers described with respects to FIG. 1.

As shown in FIG. 3, the server 310 may include a Recovery master module 335, which may replace a time master module. In this configuration, the Recovery master may be frequency-locked 325 to a very stable oscillator 338 instead of, for example, a GPS system. The stability of the oscillator 338 may determine how long and how accurately a Recovery master can serve time. For example, based on empirical data, an oven controlled crystal oscillator (OCXO) may have a short-term frequency stability of ±50 ppb (parts-per-billion, $10^{-9}$) with an aging rate of instability at 5 ppb per day, and a rubidium oscillator may have a frequency stability of ±1 ppb with an aging rate of instability at 0.03 ppb per day. It should be noted that time instability errors can accumulate linearly with the short-term stability and quadratically with the aging rate.

According to aspects, a Recovery master 335 can be calibrated against a fleet of time masters 314, 316 and 318 over a network 350. During re-calibration all available ordinary time masters may participate. Each time master 314, 316 and 318 may be synched, for example, to an individual time reference such as a GPS feed. Although only one Recovery master 335 is depicted in FIG. 3, it should be appreciated that a typical system 300 can include a number of Recovery masters, with each being at a different node of the network 350. According to aspects, re-calibrations may be staggered across several Recovery masters to avoid injecting undetected failures (e.g., GPS signal failures) into multiple Recovery masters.

An initial re-calibration interval between a Recovery master 315 and the ordinary time masters 314, 316 and 318 may be short to achieve a relatively rapid approximate synchronization. To achieve an increasingly accurate calibration, the interval may be doubled in each subsequent re-calibration until it reaches a configured constant (e.g., 60 days for Rubidium-based Recovery master and 2 days for OXCO-based Recovery master). Calibration parameters may be stored in a persistent file so that the parameters survive software restarts and server re-boots. For example, a calibrations file can be loaded into memory 330 whenever a server 310 starts. The calibrations file may contain a reference number corresponding to time master 314, 316 and 318 and corresponding calibration parameters. The re-calibrations may be discarded whenever a frequency reference is disturbed (e.g., when a time reference is power cycled).

In addition to the components described above and illustrated in the figures, various operations will now be described. It should be understood that the following operations do not have to be performed in the precise order described below. Rather, various steps may be handled in a different order or simultaneously. Steps may also be added or omitted unless otherwise stated.

According to aspects, to ensure that timestamps computed in a disturbed system are trustworthy, a subroutine, referred to herein as a time synchronization daemon, may be executed. Time synchronization daemons may be employed on one or a number of host machines simultaneously (e.g., client and time master host machines). By querying a fleet of time masters to determine a current timestamp, the time synchronization daemons may periodically compare the host's machines notion of time against the fleet of time masters. Once the fleet time masters have been queried for the current time, the time synchronization daemon may track the round-trip query delay associated with querying each time master. In some aspects, the time synchronization daemon can calculate synchronization offset intervals that may be relative to a time master (e.g., an interval between local time and a time master's notion of current time).

To detect and reject offset intervals derived from possibly malfunctioning time masters (e.g., time masters that have failed but are still producing timestamps), a voting method may be used such as a variant of Marzullo's algorithm. As a result of the voting method, the time synchronization daemon may accept output from validated time masters or reject output from certain time masters, for example, malfunctioning time masters.

Figure 4:
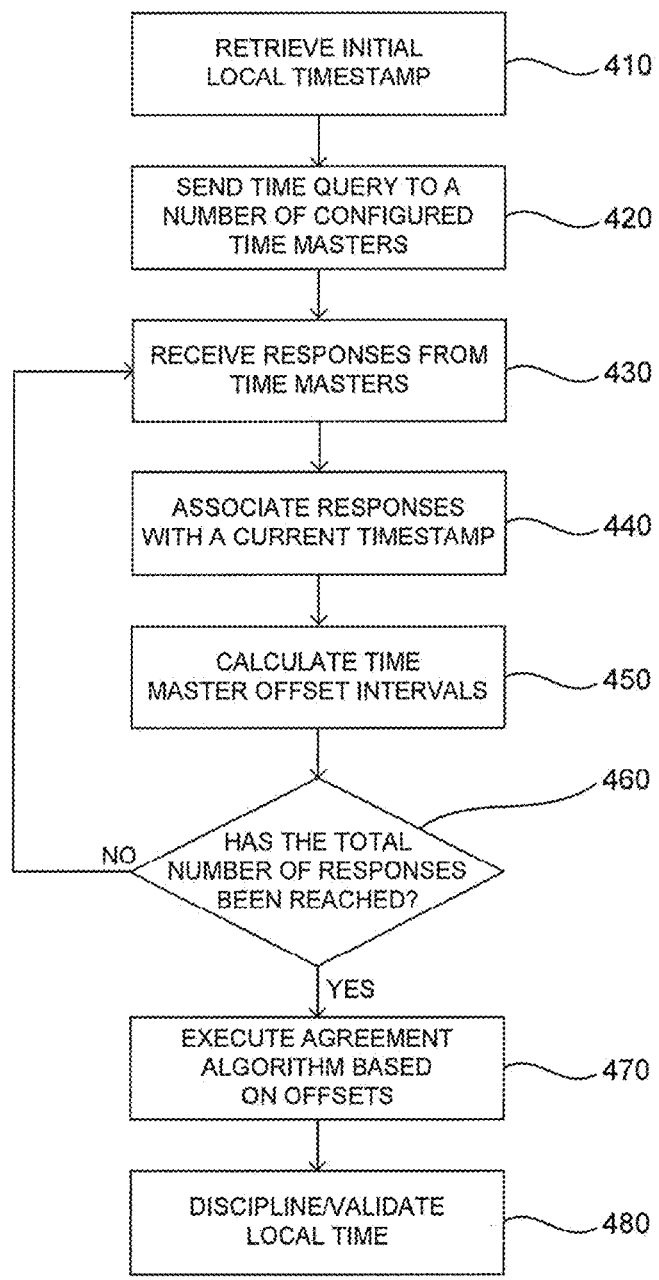
FIG. 4 is a flow diagram illustrating an example of a method for synchronizing a host machine to a set of time references according to aspects of the present technology.

FIG. 4 is a flow diagram illustrating an example of a method 400 for synchronizing a host machine (e.g., GPS-fed time master, Recovery masters and client host machine) to a set of time references. As previously discussed, time synchronization may involve time querying a configured subset of time masters and executing a voting algorithm on the query results to determine which time masters are producing accurate current timestamps.

In block 410, an initial local timestamp may be retrieved. For example, method 400 may access a registry for storing a host machine's notion of a current date and time. This may reflect time from an internal time clock on the host machine. The timestamps can be encoded in various time formats used to describe instants of time such as Coordinated Universal Time (UTC), Unix epoch and the unambiguous International Atomic Time epoch (TAI).

In block 420, time queries may be sent to a pre-determined number of time masters (e.g., 5 to 10 time masters). For example, an application interface may be utilized to make a connection to a time master for sending and receiving information. In one aspect, the time masters may operate at Stratum 1 or Stratum 2. It is also possible for time masters to operate at any arbitrary number such as from [1 . . . . K]. The basic definition of a Stratum-1 time master is that it may be directly linked (e.g., not over a network connection) to a reliable source of time such as a GPS receiver. A Stratum-2 time master may be connected to one or more Stratum-1 time masters over, for example, a network connection. In this example, a Stratum-2 time master may get its time via a network request to one or more Stratum-1 time master. In this regard, if a Stratum master is fed by a master operating at stratum K or less, it may be described as a Stratum-(K+1).

In block 430, responses may be received from the time masters queried in block 420. For example, as a result of the time request a time master may generate a timestamp. According to aspects, time masters may publish timestamps over a network connection in a distributed system. In one aspect, the application interface used to request a timestamp in block 420 may also be used to retrieve timestamp responses. Various other techniques for transmitting data over a network socket can be used to publish and receive timestamp responses, e.g., Transmission Control Protocol/Internet Protocol (TCP/IP), World Wide Web's Hypertext Transfer Protocol (HTTP), File Transfer Protocol (FTP), Telnet (Telnet) protocols and other types of communication protocols.

In block 440, a received time query response may be associated with a current local timestamp. For example, the current local timestamp may denote respective events of reception of the time query response according to a local time scale. In some aspects, associating the current local time with the time query response may be accomplished by storing both in memory, a data structure or by inserting both in a suitable computer readable medium capable of storing information accessible by a processor.

In block 450, a time offset interval may be calculated for each time masters that was queried in block 420. The offset interval's width (e.g., a length of time duration) may represent transmission delays associated with a time request to and from a particular time master. The timestamps from each non-malfunctioning time master may correspond to an instant of time somewhere between the initial local timestamp taken in block 410 and the local timestamp associated with a time master's response in block 440.

A level of uncertainty (e.g., transmission delays) may also affect the time offset interval calculation. In this regard, to calculate the offset interval for each time master, the following equations may be used:

$$D(m) = T(m) - ((L(m) + L(0))/2)$$

$$U(m) = (L(m) - L(0))/2$$

In the above equations, D(m) represents the time offset relative to time master m, T(m) represents the timestamp provided by master m, U(m) represents an uncertainty related to a time master m, L(m) represents the local time captured at the time when a time query response was received from time master m and L(0) represents a local timestamp taken prior to dispatching the time queries to the time masters. Thus, with respects to a time master m, local time may be in error by an offset D(m) plus or minus the uncertainty calculation U(m) or in other words an interval range of [D(m)−U(m) to D(m)+U(m)].

In block 460, it may be continually tested whether the total number of time query responses has been reached. If the number has been reached, then method 400 may proceed to block 460. Otherwise, method 400 may repeat block 430 and receive another time query response.

In block 470, an agreement algorithm may be employed to analyze an aggregate of the time master offset intervals calculated in block 450. Because time masters may occasionally fail, an agreement algorithm (e.g., Marzullo's algorithm) may determine a smallest time offset interval consistent among a selected group of time masters. In some aspects, the agreement algorithm may be employed more than once.

In an initial run of the agreement algorithm, a group of local time offsets calculated in block 450 may be selected. The selection may be based on a corresponding time master's configuration such as whether a time master is operating at Stratum 1. Each calculated offset may represent the local clock error relative to a particular time master. A determination may be made by method 400 for a maximal set of intersecting local time offsets from the group. In one example, if no two offset intervals intersect method 400 may stop. Method 400 may also stop if more offsets in the group disagree than agree. If at least two offset intervals intersect than an agreement validated offset interval (e.g., a smallest interval containing all points lying in the intersection of at least k-1 of the k intervals in the group) may be assigned for the group.

In one aspect, a level of uncertainty may be reflected in a group of offsets in an interval (e.g., the width of the group from smallest to largest offset). This level of uncertainty may be relatively small because typically several time masters may be nearby. Thus, the agreement validated offset determined in block 470 should be relatively accurate plus or minus a level of group uncertainty.

According to some aspects, the agreement algorithm may be employed a second time. In this iteration of the agreement algorithm, local time offsets calculated in block 450 may be selected from a group of time masters configured differently than the first group. For example, this selection may be based on time masters not operating at Stratum 1. The offset intervals corresponding to the non-Stratum 1 time masters may be clipped against the Stratum 1 offset interval. The second round may be used to steer local clocks when there is no nearby Stratum 1 time master, thus improving consistency among nearby hosts.

The second iteration of the agreement algorithm may be then applied to the clipped non-Stratum 1 offsets. This second iteration may yield a final validated offset interval which may be accurate plus or minus a level of uncertainty related to the second group of time masters. Typically, this final validated offset interval should be within the uncertainty range resulting from the first run of the agreement algorithm. In one example, the second iteration results may be discarded if the results are outside of the uncertainty range of the first iteration.

In block 480, local time on a host machine may be disciplined or validated depending on the machine's configuration. For example, if the machine employing method 400 is a GPS-fed time master, the offset interval from block 470 may be used to validate time published by the GED-fed master. If the machine is a client host or a Recovery master, the offset interval from block 470 may be used to adjust the host machine's local clock. For example, if the offset interval is [−2, −1] the local clock can be somewhere between 1 and 2 seconds ahead of the masters. If the interval is [1, 2] the local clock can be 1 to 2 seconds behind the masters. If the interval is [1, −1] the local clock can be somewhere between 1 second behind to 1 second ahead of the master.

In this regard, a host server's local system clock may be disciplined to help keep precise time. For example, small adjustments (e.g. the validated offset from block 470) may be applied to the system clock periodically. These adjustments may be applied using various utilities for accessing a system's local clock such as the utility application adjtimex. In one aspect, adjtimex may be used in PLL mode (phase-locked loop). In this example, PLL constants and offset clamps values may be chosen to bind the local clock rate error to approximately 1000 ppm. Some applications, for example, distributed lease protocols, may depend on time progressing at a similar rate on each host. For such applications to work properly clock rates need to be controlled.

Figure 5:
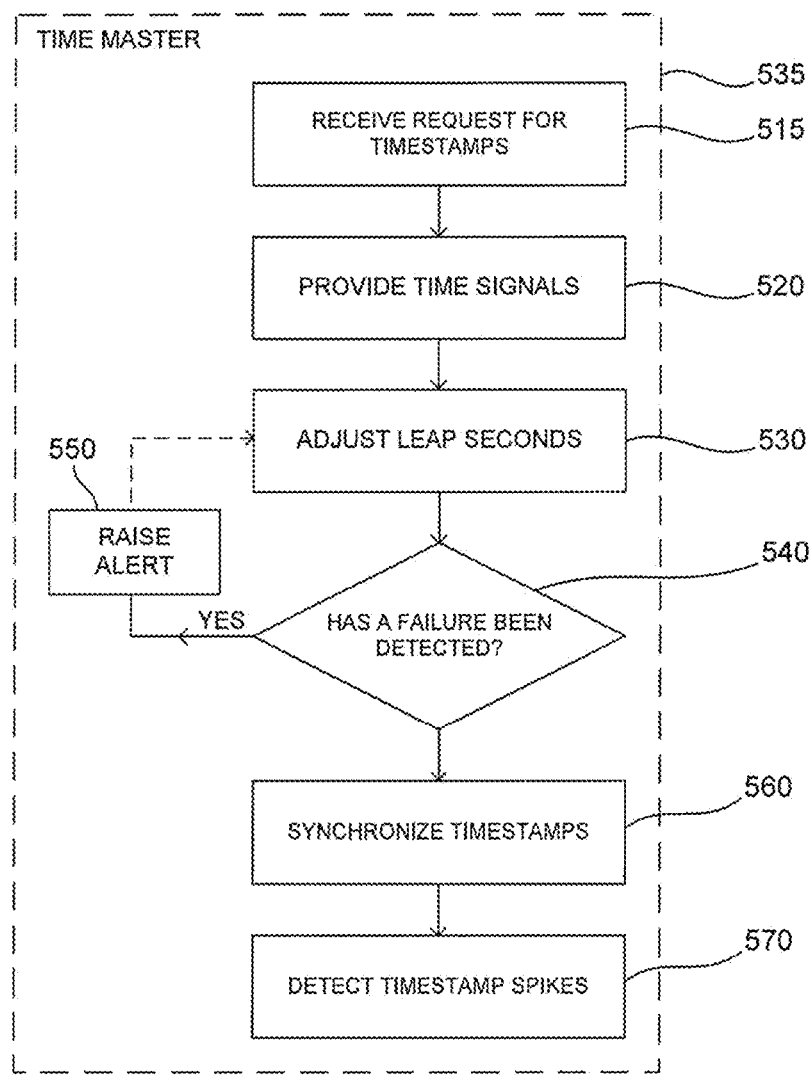
FIG. 5 is a flow diagram illustrating an example of a method for providing validated timestamps according to aspects of the present technology.

FIG. 5 is a flow diagram illustrating an example of a method for providing validated timestamps. According to aspects, cross checked and synchronized time masters 535 may be used to transmit timestamps to clients in a distributed system. In some examples, the timestamps may be used to order transactions and/or synchronize local clocks.

In block 515, a request for a timestamp may be received. For example, a client may open a socket connection to time master's host server to initiate a connection for sending and receiving information. Through this connection, the time master may act as a NTP server that transmits timestamps to the client.

In block 520, time signals may be provided from a reliable time reference. For example, GPS timestamps may be provided by a GPS disciplined oscillator (e.g., a SPECTRACOM PCI-Express Model TSync-PCIe) connected to a host server In some aspects, timestamps may be served directly from the system's oscillator. According to aspects, this may help avoid several sources of time corruption such as time-keeping bugs related to operating systems, and Time Stamp Control (TSC) deficiencies that plague many microprocessors.

In block 530, GPS timestamps may be adjusted based on a leap second. A leap second may be a positive or negative one-second adjustment to a time scale that may keep it close to mean solar time. In some aspects, leap seconds may be amortized over a period of ten hours on either side of the leap second, thus rendering the leap second invisible to a client requesting a timestamp. Several techniques may be used to amortize leap seconds, for example, they may be linearly amortized over a window of time (e.g., 10 hours on either side). A standard leap file disseminated by the National Institute of Standards and Technology (NIST) may govern leap second insertions.

In block 540, possible system failure conditions may be continually monitored. For example, a failure can be a discovered disagreement between the NIST leap file and leap seconds advertised by a connected GPS system. Other possible failures may include when the NIST file is about to expire, poor satellite signal reception, a shorted antenna cable, parity errors, etc. If a failure condition is detected, method 500 may raise an alert at block 550. Otherwise it may proceed to block 560.

In block 550, a failure alert may be raised. Once a failure condition has been detected a time master 535 may block or discard incoming time queries until the alert has been resolved. Typically, many failures may require some type of repair to be preformed. For example, some alerts may be resolved by making a request to a service for an updated NIST file for adjusting leap seconds. In this example, method 500 may optionally repeat block 530 to adjust leap seconds based on the newly provisioned NIST file. Other failures may be resolved by repairing a GPS receiver or other hardware.

In block 560, timestamps may be synchronized with an external reference. For example, timestamps from a secondary device such as a High Precision Event Timer (HPET) attached to a time master host may be used as a sanity check. According to aspects, on a server running an Intel processor, the HPET may be a fairly reliable timing device. HPET accesses can impact processing time by several microseconds. This, however, may be an acceptable impact in performance.

In block 570, timestamp spikes may be detected. If a timestamp lies outside of a determined range, it may be considered a spike. The spikes may be logged, but not transmitted to clients. In one example, spikes may be detected by planting guideposts to demark an acceptable range for the timestamps. In this example, a guidepost can be correlated GPS and HPET timestamps planted periodically. Each GPS timestamp may be checked against the bounds since the last guidepost was planted. This check may provide a measure of protection against, for example, GPS system faults and satellite signal spoofing attacks. The spike-detection process employed in block 560 is further described with respects to FIG. 6.

Figure 6:
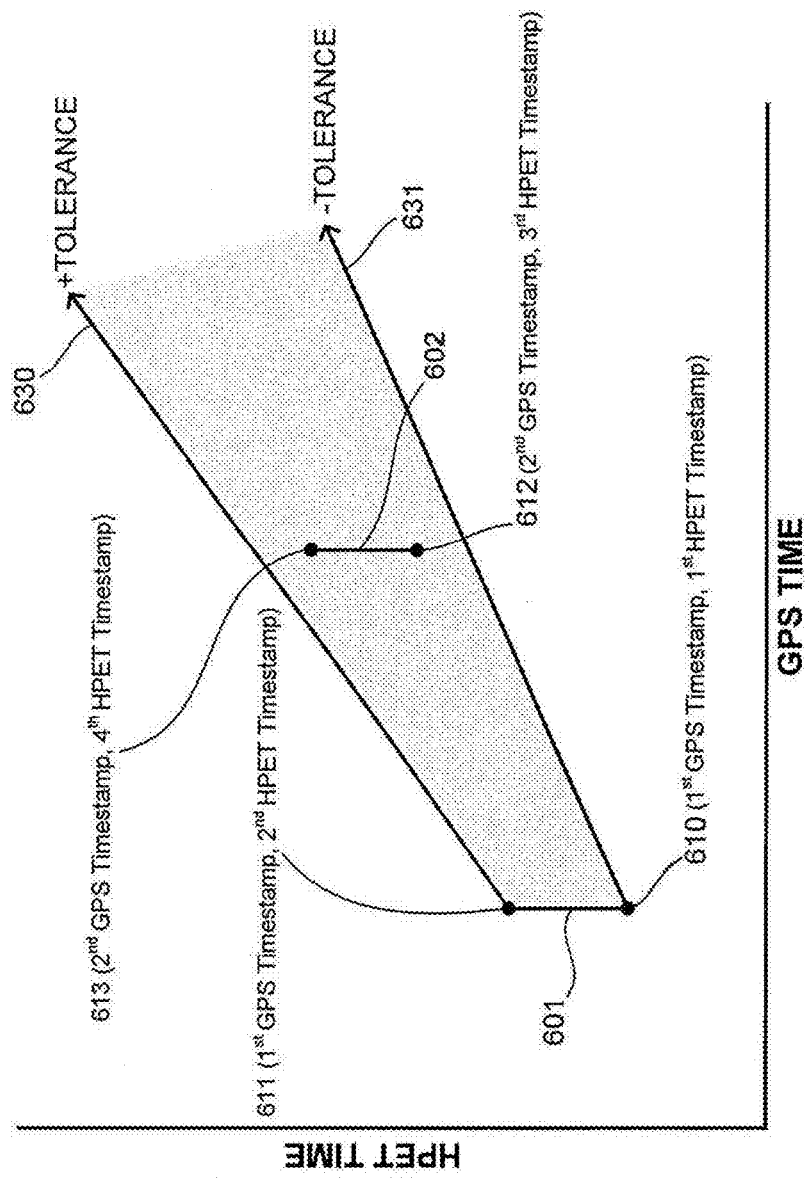
FIG. 6 is a graph of correlated time stamps according to aspects of the present technology.

FIG. 6 is a graph of correlated time stamps. In some aspects, correlated GPS and HPET time stamps may be represented as a graph. As shown in FIG. 6, guideposts 601 and 602 are associated with a series of GPS and HPET time stamps 610, 611, 612 and 613 plotted on the graph (e.g., (x, y) coordinates). For example, plot points 610 and 611 are determined by a pair of GPS and HPET time stamp readings. According to aspects, guidepost 601 may be associated with three timestamps taken in the following order: a $1^{st}$ HPET timestamp, a $1^{st}$ GPS timestamp and a $2^{nd}$ HPET timestamp. In one aspect, dumbbell 601 may be used as a guidepost to validate subsequent GPS timestamp readings as further described below.

As illustrated, emanating from the initial guidepost 601 are rays 630 and 631 positioned at angles. A shaded region (e.g., the cone of uncertainty) between the rays reflects an uncertainty about the precision of the HPET frequency plus or minus a predetermined tolerance level. According to aspects, if a subsequent reading of a GPS timestamp intersects the shaded region, it may be accepted as a valid timestamp. If it does not intersect the shaded region, it may then be declared a spike because it violates the HPET frequency error bounds 630 and 631.

The guidepost 601 may be advanced at a rate determined by roughly balancing the uncertainty induced by HPET frequency errors, the GPS system and HPET read latencies. In one example, guideposts are advanced approximately every 100 milliseconds. A new guidepost, such as guidepost 602, may be planted when the previous guidepost 601 expires and a new valid GPS timestamp is obtained for verification. The newly obtained GPS timestamp may also become an anchor in the new guidepost. For example, plot points 612 and 613 of guidepost 602 are determined by a subsequent pair of GPS and HPET time stamp readings. In one aspect, the guidepost 602 may be associated with three timestamps taken in the following order: a $3^{rd}$ HPET timestamp, a $2^{nd}$ GPS timestamp and a $4^{th}$ HPET timestamp.

According to aspects, spikes with high-frequency synchronization errors that exceed approximately 20 microseconds may be detected. As well as, low frequency wander spikes exceeding the worst-case HPET variation. In some aspects, it may be desirable to use a number of spike detectors, each advancing at a different rate. In this regard, a spike detector advancing at a rapid rate may be better at detecting high-speed spikes, while a detector advancing at a slower rate may be better at detecting gradual frequency shifts in a time master.

Figure 7:
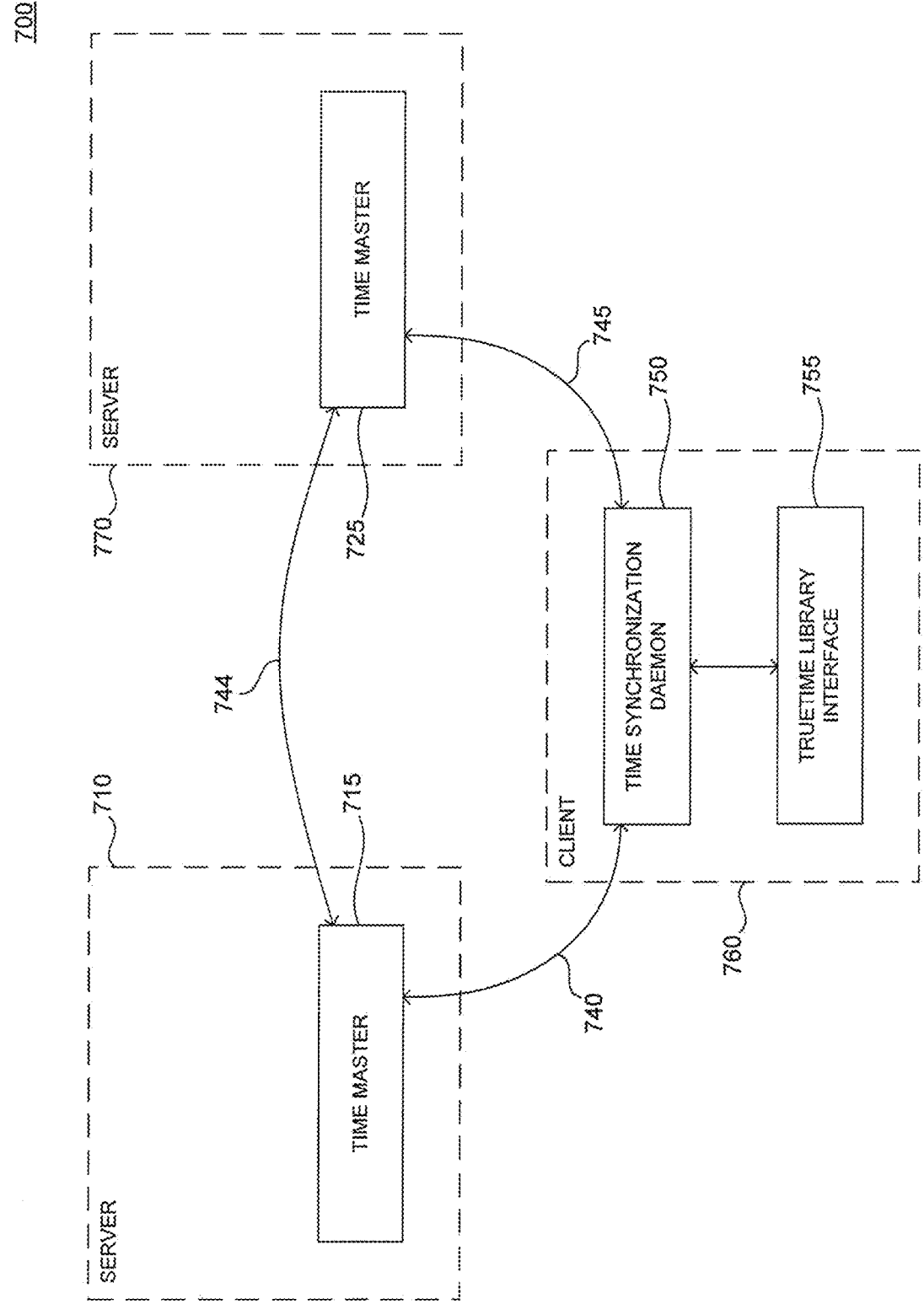
FIG. 7 is yet another diagram of a system according to aspects of the present technology.

FIG. 7 is yet another diagram of a system 700 in accordance with an aspect of the present technology. As shown, system 700 may consist of at least three major modules: a time master (e.g., time masters 715 and 725) that may serve as a reliable time reference, a time synchronization daemon 750 that may synchronize local time by periodically querying multiple time masters and a TrueTime library interface 755 for providing a current time interval interface to applications. The three modules may be capable of direct and indirect communication over, e.g., a network connection 740 and 745. Each module may consist of middleware software that may manage and integrate the modules with a host machines 710, 760 and 770 such as the servers and client described with respects to FIG. 1.

According to aspects, time masters 715 and 725 may serve as primary time references in a distributed system. As previously discussed, the time masters' internal clocks may be synchronized with, e.g., a GPS signal, atomic clock or other types of accurate timekeeping technologies known in the arts. The time masters may be designed for high reliability and may be deployed at multiple sites throughout a distributed system. Although only two time masters are depicted in FIG. 7, it should be appreciated that a typical system 700 can include a large number of time masters communicating with each other over, e.g., a network connection 744.

The time synchronization daemon 750 may periodically query multiple time masters 715 and 725 for a current timestamp. The daemons may calculate synchronization offset intervals relative to each time master 715 and 725 by tracking round-trip delays related to a time query. Sets of time master offsets may be validated against each other using, e.g., clock synchronizing techniques as described with respects to FIG. 4. As previously discussed the clock synchronizing techniques may employ an agreement algorithm to detect and reject offsets from malfunctioning time masters. An intersection of surviving offset intervals may be used to determine a client's local time synchronization error, which may have occurred at the time a query was made to a time master 715 and 725. Accordingly, the client's local clock rate may be updated based on the surviving offset intervals.

A TrueTime library interface 755 may be employed to transmit validated timestamps requested by client applications. For example, a client may use an application programming interface (API) that may be operable in conjunction with the TrueTime library in order to communicate with modules of system 700. The TrueTime library may also calculate a local time offset interval (e.g., a difference between local time and a time reference) based on such factors as a local clock, known rate errors related to the local clock, and an offset interval determined by the time synchronization daemon 750 at the last time the time masters 715 and 725 were polled.

In some instances, it may be difficult to determine an order of events in a distributed system because system clocks are not always synchronized. However, event ordering can be determined using timestamps generated with the TrueTime library rather than using a machine-local approximation of current time. In one aspect, timestamps determined by employing the TrueTime library can be used as a basis for making causally dependent information available to host clients in a distributed system. For example, this information can be used by an application associated with a host client to causally order event transactions.

Figure 8:
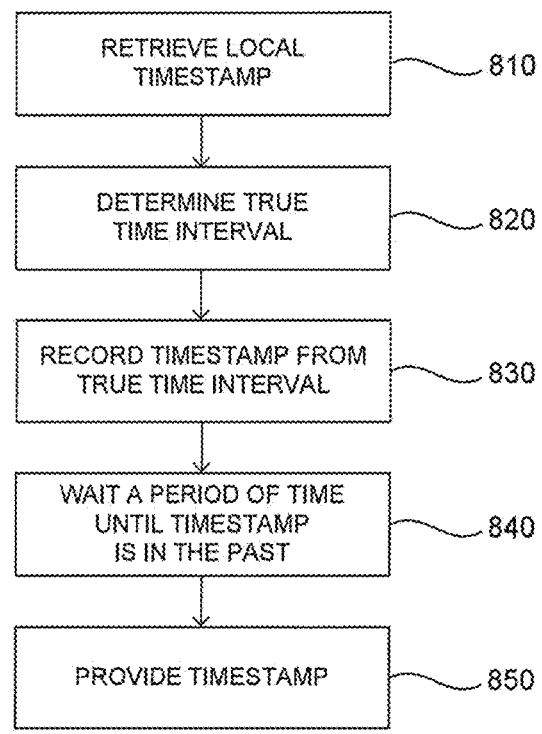
FIG. 8 is a flow diagram illustrating an example of a method for generating causal timestamps according to aspects of the present technology.

FIG. 8 is a flow diagram illustrating an example of a method 800 for generating causal timestamps. For example, a host client may employ an application interface (e.g., TrueTime library interface), which may provide globally consistent timestamps with explicit uncertainty bounds (e.g., network transmission delays) associated with transmitting the timestamps. The timestamps may be then used, for example, to order events in a distributed system.

In block 810, an initial local timestamp may be retrieved. For example, a host client's notion of a current date and time may be accessed and stored. This may reflect time from an internal time clock, memory registry or other means of tracking time on the host machine.

In block 820, a time interval may be determined (e.g., a difference between the local timestamp and a time reference). For example, a software module operable in conjunction with a TrueTime library interface may request a time interval provided by the TrueTime library. As previously discussed the TrueTime library may provide a time interval interface to host clients requiring meaningful globally-coherent timestamps. The TrueTime library may determine the time interval from a time synchronization daemon employed locally on a host client. As described with respect to FIG. 7, host clients may employ a time synchronization daemon, which may track a correlation between local clocks and causal time by computing uncertainty bounds on that correlation. The time synchronization daemon may derive a causal time by querying a number of time masters deployed throughout a distributed system. In some aspects, the time synchronization daemon may determine a time interval consistent among a selected group of time masters by employing an agreement algorithm on the selected group.

In block 830, a timestamp from the time interval may be recorded. For example, the latest timestamp in the time interval determined in block 820 may be selected. According to aspects, this timestamp may be larger than the timestamp of other causal predecessors. In one aspect, the timestamp may be recorded and maintained in a predetermined format. For example, the timestamp can be encoded in a time format used to describe instants of time such as UTC. Consistent time formatting may, for example, allow for comparison of the timestamp with local timestamps from one or more different systems.

In block 840, a period of time may pass after a timestamp is recorded from the time interval. The time period for waiting may be chosen so that after the waiting period the time of recorded timestamp has passed. According to aspects, waiting may preserve the causal order of events by ensuring that causal successors (e.g., logically ordered transactions) will be assigned respectively larger timestamps. For example, if the current time is between 3:50 PM and 4:00 PM, and a 10 minute waiting period is chosen, then after the waiting period it will be later than 4:00 PM and, thus any future-chosen timestamps will be later than 4:00 PM. It will be appreciated that in some aspects other types of client computations can occur in block 840 while the time period is passing.

In block 850, the recorded timestamp may be provided. For example, a programming interface may be used by a host client to access the recorded timestamp from block 830. The timestamp may also be returned as a result of a call to a computer program, library class function or other types of programming techniques known in the arts. The host client may then associate the timestamp, e.g., with host client events thereby ensuring a causal order of event transactions for services accessed at the client.

The above-described aspects of the technology may be advantageous for generating globally synchronized timestamps without incurring various types of network delay inherent in explicit synchronization. The globally synchronized timestamps can be used by various services, e.g., to validate local timestamps and clocks, or to provide causality-respecting timestamps for database updates. By introducing techniques to track, calculate and record time data relative to a number of reliable time references, an easy-to-manage and low-cost time base may be provided for host machines in a distributed system. Moreover, the various techniques and parameters disclosed within may be further reconfigured to increase overall timestamp accuracy.

Although the present technology has been described with reference to particular embodiments, it should be understood that these examples are merely illustrative of the principles and applications of the present technology. For example, it should be understood that the described systems and methods can be performed in part or in their entirety on a mobile client device (e.g., a mobile phone), on a remote computing device (e.g., a server), or on some combination thereof. Additionally, it should be understood that numerous other modifications could be made to the illustrative embodiments. However, these and other arrangements may be devised without departing from the spirit and scope of the present technology as defined by the appended claims.

The invention claimed is:

1. A method for providing validated timestamps, comprising:
   receiving, with one or more processors, a timestamp from a time reference system;
   determining, with the one or more processors, that one or more failure conditions associated with the timestamp are present;
   in response to determining that one or more failure conditions are present, adjusting, with the one or more processors, the timestamp until the one or more failure conditions are no longer present;
   synchronizing, with the one or more processors, the timestamp with a reference timestamp; and
   outputting, with the one or more processors, the timestamp.

2. The method of claim 1, wherein the time reference system is a global positioning system (GPS) disciplined oscillator.

3. The method of claim 1, wherein the timestamp is a GPS timestamp.

4. The method of claim 1, wherein the timestamp is adjusted based on mean solar time.

5. The method of claim 1, wherein the timestamp is adjusted based on an amount of leap seconds within a National Institute of Standards and Technology (NIST) leap file.

6. The method of claim 5, wherein the failure conditions are based on at least one of: a disagreement between the amount of leap seconds within the NIST leap file and an amount of leap seconds advertised by a connected GPS system, an expiration of the NIST leap file, a satellite signal reception issue, a shorted antenna cable, or a parity error.

7. The method of claim 1, wherein the reference timestamp a High Precision Event Timer (HPET) timestamp.

8. The method of claim 1, wherein synchronizing the timestamp with the reference timestamp is based on an acceptable tolerance of uncertainty between the timestamp and the reference timestamp.

9. The method of claim 8, wherein the acceptable tolerance of uncertainty is based on guideposts associated with coordinates based on the timestamp and the reference timestamp.

10. The method of claim 8, further comprising determining, with the one or more processors, that values of the timestamp outside of the acceptable tolerance of uncertainty are timestamp spikes.

11. A system for providing validated timestamps, the system comprising one or more processors configured to:
receive a timestamp from a time reference system;
determine that one or more failure conditions associated with the timestamp are present;
in response to determining that one or more failure conditions are present, adjust the timestamp until the one or more failure conditions are no longer present;
synchronize the timestamp with a reference timestamp; and
output the timestamp.

12. The system of claim 11, wherein the time reference system is a global positioning system (GPS) disciplined oscillator.

13. The system of claim 11, wherein the timestamp is a GPS timestamp.

14. The system of claim 11, wherein the timestamp is adjusted based on mean solar time.

15. The system of claim 11, wherein the timestamp is adjusted based on an amount of leap seconds within a National Institute of Standards and Technology (NIST) leap file.

16. The system of claim 15, wherein the failure conditions are based on at least one of: a disagreement between the amount of leap seconds within the NIST leap file and an amount of leap seconds advertised by a connected GPS system, an expiration of the NIST leap file, a satellite signal reception issue, a shorted antenna cable, or a parity error.

17. The system of claim 11, wherein the reference timestamp a High Precision Event Timer (HPET) timestamp.

18. The system of claim 11, wherein synchronizing the timestamp with the reference timestamp is based on an acceptable tolerance of uncertainty between the timestamp and the reference timestamp.

19. The system of claim 18, wherein the acceptable tolerance of uncertainty is based on guideposts associated with coordinates based on the timestamp and the reference timestamp.

20. A non-transitory computer-readable medium for storing instructions that, when executed by one or more processors, cause the one or more processors to:
receive a timestamp from a time reference system;
determine that one or more failure conditions associated with the timestamp are present;
in response to determining the one or more failure conditions are present, adjust the timestamp until the one or more failure conditions are no longer present;
synchronize the timestamp with a reference timestamp; and
output the timestamp.

* * * * *